(12) United States Patent
Petronius et al.

(10) Patent No.: US 9,091,413 B2
(45) Date of Patent: Jul. 28, 2015

(54) INTEGRATED PHOTONICS MODULE FOR OPTICAL PROJECTION

(71) Applicant: PRIMESENSE LTD., Tel Aviv (IL)

(72) Inventors: Israel Petronius, Haifa (IL); Zafrir Mor, Ein Habsor (IL); Mordehai Margalit, Zichron Yaakov (IL); Benny Pesach, Rosh HaAyin (IL); Alexander Shpunt, Tel Aviv (IL)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/231,764

(22) Filed: Apr. 1, 2014

(65) Prior Publication Data

US 2014/0211084 A1    Jul. 31, 2014

Related U.S. Application Data

(63) Continuation of application No. 13/008,042, filed on Jan. 18, 2011, now abandoned, which is a continuation-in-part of application No. 12/762,373, filed on Apr. 19, 2010, now abandoned.

(60) Provisional application No. 61/300,465, filed on Feb. 2, 2010.

(51) Int. Cl.
| | |
|---|---|
| *F21V 7/04* | (2006.01) |
| *B23P 11/00* | (2006.01) |
| *F21V 7/00* | (2006.01) |
| *F21V 13/04* | (2006.01) |
| *G01B 11/25* | (2006.01) |
| *G02B 26/10* | (2006.01) |

(52) U.S. Cl.
CPC . *F21V 7/04* (2013.01); *B23P 11/00* (2013.01); *F21V 7/00* (2013.01); *F21V 13/04* (2013.01); *G01B 11/25* (2013.01); *G02B 26/10* (2013.01); *Y10T 29/49117* (2015.01); *Y10T 29/49826* (2015.01)

(58) Field of Classification Search
CPC ............. H04N 5/2256; G03B 2215/05; G03B 2215/0503
USPC .......................................................... 348/371
See application file for complete search history.

(56) References Cited

U.S. PATENT DOCUMENTS

| | | | |
|---|---|---|---|
| 3,401,590 A | 9/1968 | Gail et al. | |
| 5,606,181 A * | 2/1997 | Sakuma et al. | 257/88 |
| 7,936,450 B2 | 5/2011 | Hoersch et al. | |
| 2006/0252169 A1* | 11/2006 | Ashida | 438/29 |

OTHER PUBLICATIONS

International Application # PCT/IB2014/062245 Search Report dated Dec. 3, 2014.

* cited by examiner

*Primary Examiner* — Sinh Tran
*Assistant Examiner* — Mark Monk
(74) *Attorney, Agent, or Firm* — D. Kligler I.P. Services Ltd.

(57) ABSTRACT

Optical apparatus includes a semiconductor substrate and an edge-emitting radiation source, mounted on a surface of the substrate so as to emit optical radiation along an axis that is parallel to the surface. A reflector is fixed to the substrate in a location on the axis and is configured to reflect the optical radiation in a direction that is angled away from the surface. One or more optical elements are mounted on the substrate so as to receive and transmit the optical radiation reflected by the reflector.

16 Claims, 9 Drawing Sheets

INTEGRATED PHOTONICS MODULE FOR OPTICAL PROJECTION

CROSS-REFERENCE TO RELATED APPLICATION

This application is a division of U.S. patent application Ser. No. 13/008,042, filed Jan. 18, 2011, which is a continuation-in-part of U.S. patent application Ser. No. 12/762,373, filed Apr. 19, 2010, and claims the benefit of U.S. Provisional Patent Application 61/300,465, filed Feb. 2, 2010. All of these related applications are incorporated herein by reference.

FIELD OF THE INVENTION

The present invention relates generally to optoelectronic devices, and specifically to integrated projection devices.

BACKGROUND

Miniature optical projectors are used in a variety of applications. For example, such projectors may be used to cast a pattern of coded or structured light onto an object for purposes of 3D mapping (also known as depth mapping). In this regard, U.S. Patent Application Publication 2008/0240502, whose disclosure is incorporated herein by reference, describes an illumination assembly in which a light source, such as a laser diode or LED, transilluminates a transparency with optical radiation so as to project a pattern onto the object. (The terms "optical" and "light" as used herein refer generally to any of visible, infrared, and ultraviolet radiation.) An image capture assembly captures an image of the pattern that is projected onto the object, and a processor processes the image so as to reconstruct a three-dimensional (3D) map of the object.

PCT International Publication WO 2008/120217, whose disclosure is incorporated herein by reference, describes further aspects of the sorts of illumination assemblies that are shown in the above-mentioned US 2008/0240502. In one embodiment, the transparency comprises an array of micro-lenses arranged in a non-uniform pattern. The micro-lenses generate a corresponding pattern of focal spots, which is projected onto the object.

Optical projectors may, in some applications, project light through one or more diffractive optical elements (DOEs). For example, U.S. Patent Application Publication 2009/0185274, whose disclosure is incorporated herein by reference, describes apparatus for projecting a pattern that includes two DOEs that are together configured to diffract an input beam so as to at least partially cover a surface. The combination of DOEs reduces the energy in the zero-order (undiffracted) beam. In one embodiment, the first DOE generates a pattern of multiple beams, and the second DOE serves as a pattern generator to form a diffraction pattern on each of the beams.

SUMMARY

Embodiments of the present invention that are described hereinbelow provide photonics modules that include optoelectronic components and optical elements in a single integrated package. Although the disclosed embodiments relate specifically to modules that are used in projecting patterned light, the principles of these embodiments may similarly be applied in other sorts of systems.

There is therefore provided, in accordance with an embodiment of the present invention, optical apparatus, including a semiconductor substrate and an edge-emitting radiation source, mounted on a surface of the substrate so as to emit optical radiation along an axis that is parallel to the surface. A reflector is fixed to the substrate in a location on the axis and is configured to reflect the optical radiation in a direction that is angled away from the surface. One or more optical elements are mounted on the substrate so as to receive and transmit the optical radiation reflected by the reflector.

In some embodiments, the radiation source includes a laser diode, which has a front surface, through which the optical radiation is emitted toward the reflector, and a rear surface. The apparatus may include a radiation sensor mounted on the substrate adjacent to the rear surface of the laser diode for monitoring an output of the laser diode.

In one embodiment, the apparatus includes a cap, which covers the radiation source, reflector and optical elements, and which includes a transparent window through which the radiation exits the apparatus. A radiation sensor is mounted in the cap adjacent to the window for monitoring an output of the apparatus.

The reflector may include a reflecting surface that is etched into the substrate. Alternatively, when the substrate includes a single crystal, the reflector may include a reflecting surface formed by cleaving the substrate along an axis of the crystal.

In some embodiments, the reflector includes an optical surface having a profile selected to impart a desired convergence or divergence to the radiation. The optical surface may include a concave reflecting surface for increasing an angular spread of the radiation. The concave reflecting surface may be tilted relative to the axis, and wherein the profile has a conical shape. Alternatively, the reflector may include a prism having an inner reflecting surface and having entry and exit faces, such that at least one of the entry and exit faces is curved.

The one or more optical elements may include a lens. Alternatively or additionally, the one or more optical elements may include a patterned element, such as a diffractive optical element.

In one embodiment, the reflector includes a scanning mirror, which is configured to scan the reflected optical radiation over a predetermined angular range. The scanning mirror may include a micro-electrical mechanical system (MEMS) driver, which is mounted on the substrate at a diagonal relative to the surface on which the radiation source is mounted. Typically, the optical radiation from the radiation source impinges on the scanning mirror without other optics intervening between the radiation source and the scanning mirror.

In another embodiment, the radiation source includes a plurality of edge-emitting radiation sources which are arranged together on the substrate to emit the optical radiation along multiple, respective axes.

There is also provided, in accordance with an embodiment of the present invention, optical apparatus, including a semiconductor substrate and a first array of surface-emitting radiation sources, which are mounted on a surface of the substrate so as to emit optical radiation along respective axes that are perpendicular to the surface. A second array of optical elements are mounted over the first array and aligned with the respective axes so that each optical element receives and transmits the optical radiation emitted by a respective radiation source.

There is additionally provided, in accordance with an embodiment of the present invention, an imaging system, including an illumination assembly, which is configured to project a pattern of optical radiation onto an object, as described above. An imaging assembly is configured to capture an image of the pattern on the object, and a processor is configured to process the image so as to generate a depth map of the object.

There is further provided, in accordance with an embodiment of the present invention, a method for producing a photonics module, including mounting an edge-emitting radiation source on a surface of a semiconductor substrate so that the source emits optical radiation along an axis that is parallel to the surface. A reflector is fixed to the substrate in a location on the axis so as to reflect the optical radiation is a direction that is angled away from the surface. One or more optical elements are mounted on the substrate so as to receive and transmit the optical radiation reflected by the reflector.

The present invention will be more fully understood from the following detailed description of the embodiments thereof, taken together with the drawings in which:

DETAILED DESCRIPTION OF EMBODIMENTS

Overview and System Description

Embodiments of the present invention that are described hereinbelow provide photonics modules that include optoelectronic components and optical elements (refractive and/or patterned) in a single integrated package. These modules can be produced in large quantities at low cost, while offering good optical quality and high reliability. They are useful as projectors of patterned light, for example in 3D mapping applications as described above, but they may also be used in various other applications that use optical projection and sensing, including free-space optical communications.

Figure 1:
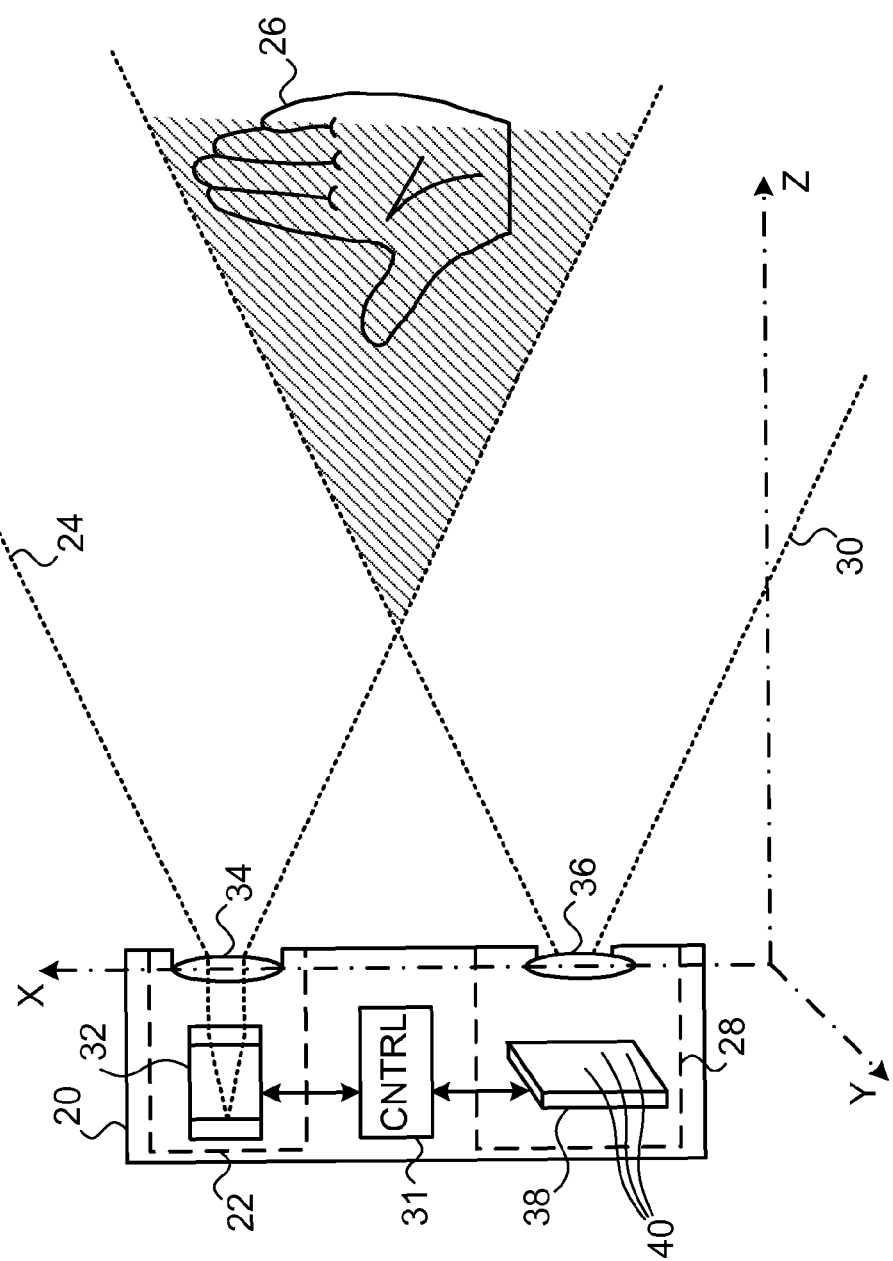
FIG. 1 is a schematic side view of an imaging system, in accordance with an embodiment of the present invention.

FIG. 1 is a schematic side view of an imaging system 20, in accordance with an embodiment of the present invention. A set of X-Y-Z axes is used in this figure and throughout the description that follows to aid in understanding the orientation of the figures, wherein the X-Y plane is the frontal plane of system 20, and the Z-axis extends perpendicularly from this plane toward the scene that is to be imaged. The choice of axes, however, is arbitrary and is made solely for the sake of convenience in describing embodiments of the invention.

An illumination assembly 22 projects a patterned radiation field 24 onto an object 26 (in this case a hand of a user of the system) in a scene. An imaging assembly 28 captures an image of the scene within a field of view 30. A controller 31 or other electronic processor processes the image in order to generate a 3D depth map of object 26. Further details of this sort of mapping process are described, for example, in the above-mentioned US 2008/0240502 and in PCT International Publication WO 2007/105205, whose disclosure is also incorporated herein by reference. The 3D map of the user's hand (and/or other parts of the user's body) may be used in a gesture-based computer interface, but this sort of functionality is beyond the scope of the present patent application.

Imaging assembly 28 comprises objective optics 36, which form an optical image of the scene containing object 26 on an image sensor 38, such as a CMOS integrated circuit image sensor. The image sensor comprises an array of sensor elements 40, arranged in multiple rows. The sensor elements generate respective signals in response to the radiation focused onto them by optics 36, wherein the pixel value of each pixel in the electronic images output by image sensor 38 corresponds to the signal from a respective sensor element 40.

Illumination assembly 22 comprises a projection subassembly 32, which generates a beam of patterned light, and projection optics 34, which project the beam onto field 24. The design, production and operation of subassembly 32 are described in detail hereinbelow. Subassemblies of this sort may be used in the sorts of pattern projectors that are described in the above-mentioned US 2008/0240502 and WO 2008/120217 publications, for example, as well as in pattern projectors based on diffractive optical elements (DOEs), such as those described in U.S. Patent Application Publication 2010/0284082, whose disclosure is incorporated herein by reference. Alternatively, as noted earlier, subassemblies of this sort may be configured for other applications.

Figures 2A, 2B:
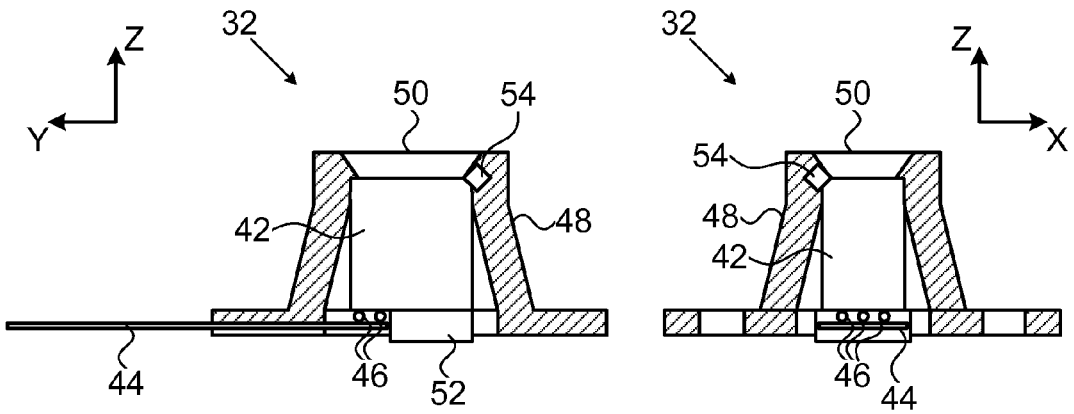
FIGS. 2A and 2B are schematic sectional views of a projection subassembly, in accordance with an embodiment of the present invention.

FIGS. 2A and 2B show schematic sectional views of projection subassembly 32 in two orthogonal planes, in accordance with an embodiment of the present invention. Subassembly 32 comprises an integrated photonics module (IPM) 42, which is shown in detail, in various different embodiments, in the figures that follow. Briefly put, IPM 42 comprises an optoelectronic light source, such as a laser diode or light-emitting diode (LED), with optics for directing light upward (the Z-direction in the frame of reference shown in the figures). The light source is mounted on a semiconductor substrate, such as a silicon wafer, which serves as an optical bench. A focusing component, such as a lens, collects and directs the light through a patterned element, such as a DOE or micro-lens array (MLA). Projection optics 34 outside subassembly 32 (at the right of assembly 22 in the view shown in FIG. 1, or above subassembly 32 in the views of FIGS. 2A and 2B) may be used to cast the pattern onto object 26.

Electrical conductors on the substrate of IPM 42 are connected to an electrical interface, which in this embodiment has the form of a flexible printed circuit 44, for coupling to power and control circuits. The connection between the IPM substrate and FPC 44 may be via any suitable type of interconnect, such as terminals 46 of a ball-grid array.

IPM 42 may be mounted on a thermo-electric cooler (TEC) 52, which holds the IPM at a constant temperature and thus reduces frequency variations of the light source due to temperature change. The TEC can also help in extending the life of the light source. The semiconductor surface that contacts the TEC is typically metalized (not shown) and flat for good thermal contact. Subassembly 32 may also comprise a temperature sensor, such as a thermistor or thermocouple (not shown), which provides a temperature signal for use in controlling the operation of TEC 52 to maintain a constant temperature.

A cap 48 covers and attaches IPM 42 to TEC 52, and attaches both of them to an underlying chassis (not shown), with good thermal conductivity. The gaps between the cover cap and the IPM may be filled with a suitable glue. The cover cap has a transparent window 50 through which the patterned beam from IPM 42 exits subassembly 32. The IPM and cap in this embodiment are not cylindrically symmetrical (having a greater width in the plane of FIG. 2A than that of FIG. 2B) because the beam output by the IPM is similarly non-symmetrical. In this embodiment, for example, projection subassembly 32 may project a light pattern with a field of view of 63.1°×48.35°.

A radiation sensor, such as a monitoring photodiode (MPD) 54, may be incorporated into projection subassembly in order to monitor the output light intensity from the light source. Such sensors are useful both in maintaining the power level of IPM 42 within desired limits and verifying eye-safe operation. These functions of MPD 54, as well as alternative modes of implementation of the light sensor, are described in detail in U.S. patent application Ser. No. 12/945,908, filed Nov. 15, 2010, whose disclosure is incorporated herein by reference. In the embodiment shown in FIG. 2, MPD 54 is located at the side of transparent window 50 in order to measure the light intensity in an unused part of the pattern (such as an unused diffraction lobe) projected by the patterned element in IPM 42. If the MPD senses light intensity in excess of a predetermined threshold, controller 31 may automatically switch off or reduce the power to the IPM. Additionally or alternatively, one or more MPDs may be positioned and calibrated to sense the projected power distribution (and not only the total power), and controller 31 may turn off or otherwise modify the operation of the IPM if an undesired change in the distribution occurs.

IPM Embodiments With a Single Light Source

Figure 3:
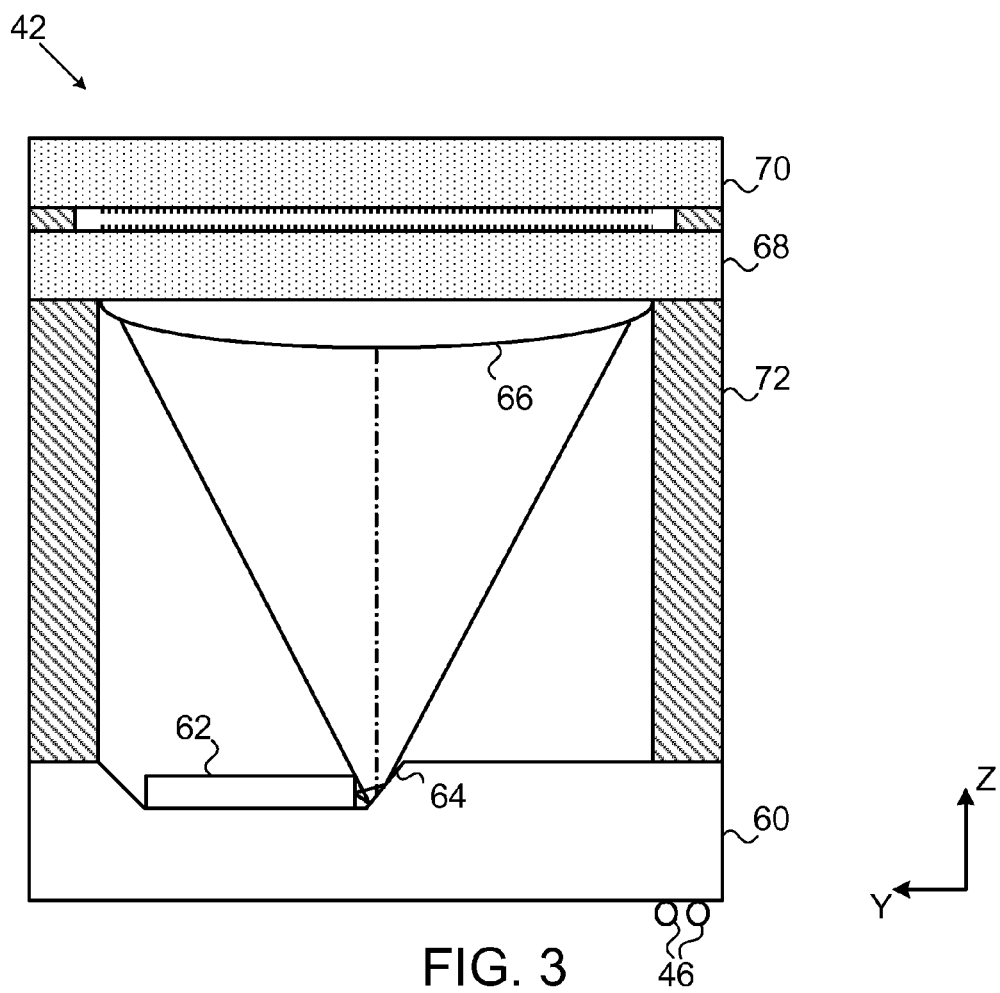
FIG. 3 is a schematic sectional view of an integrated photonics module (IPM), in accordance with an embodiment of the present invention.

FIG. 3 is a schematic sectional view showing details of IPM 42, in accordance with an embodiment of the present invention. IPM 42 as shown in this figure comprises an edge-emitting radiation source, such as a laser diode 62, on a substrate in the form of a silicon optical bench 60. Laser diode 62 may comprise, for example, a GaAs laser diode, which is electrically and mechanically bonded to optical bench 60 and emits radiation in the near-infrared range (for example, at 828 nm) along an axis that is parallel to the optical bench. ("Parallel" in this case may be an approximate term, since the laser beam typically has a divergence of at least several degrees.) Alternatively, other types of coherent or non-coherent solid-state emitters may be used. A reflector is fixed to optical bench 60 in the form of a mirror surface 64 etched into the bench at a 45° angle, which is coated so as to reflect the laser radiation upward, at an angle (in this case 90°) relative to the surface of the optical bench.

A lens 66 collects and collimates light from laser diode 62 that has been reflected from mirror surface 64, directing the light through a pair of DOEs 68 and 70. These two DOEs may be configured as described in the above-mentioned US 2009/0185274 or US 2010/0284082, and may thus serve as an eye-safe pattern projector for 3D mapping. Alternatively, the two DOEs may be replaced by one or more patterned elements of another type, such as a MLA, or by an active element that can creates a variable pattern, such as a spatial light modulator (SLM) with suitable control circuits. The optical elements (lens 66 and DOEs 68 and 70) that receive and transmit the light from laser diode 62 are mounted on bench 60 by means of spacers 72.

In addition, IPM 42 may comprise other components not shown in the figure, such as a thermistor (or other temperature sensor) and/or a MPD. The MPD may be adjacent to the rear face of laser diode 62, as shown below in FIG. 4, or in any other suitable location.

Laser diode 62 may, in this embodiment, comprise end reflectors configured to define a Fabry-Perot cavity. Alternatively, the laser diode may comprise a reflector in the form of a volume Bragg grating (VBG). (Because the VBG is applied externally to the laser, in order to reflect the desired wavelength back into the cavity, high accuracy is required in placement of the VBG. The micron-level accuracy of the silicon optical bench in the present design supports the use of a VBG without substantial added complexity or cost.) Further alternatively, the laser diode may comprise a distributed feedback (DFB) grating. These latter configurations are advantageous in maintaining wavelength stability and may alleviate the need for TEC 52.

Figure 4:
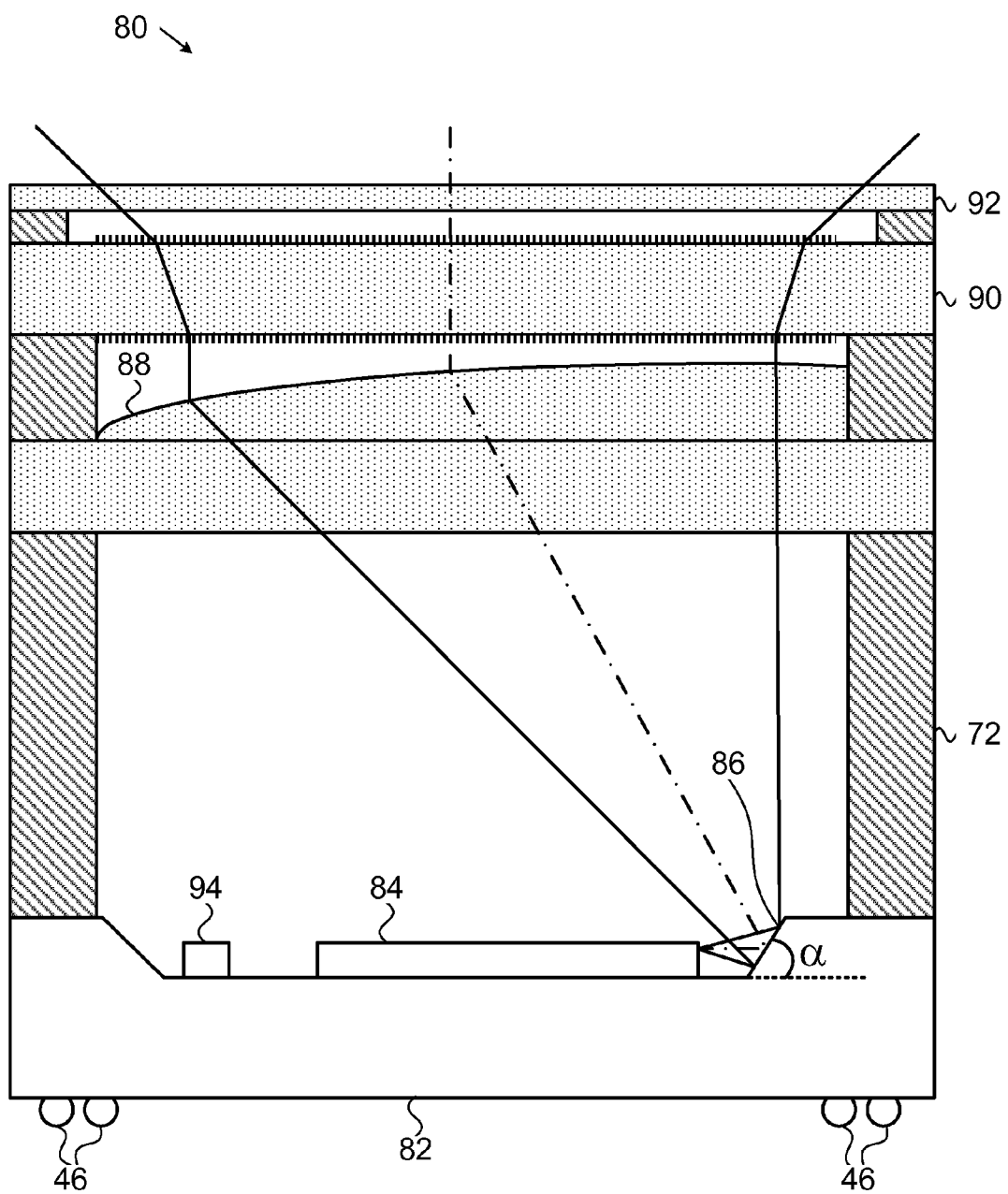
FIG. 4 is a schematic sectional view of an IPM, in accordance with an alternative embodiment of the present invention.

FIG. 4 is a schematic sectional view showing details of an IPM 80, in accordance with an alternative embodiment of the present invention. IPM 80 may be used in place of IPM 42 in projection subassembly 32, as well as in other applications. In the embodiment of FIG. 4, a silicon optical bench 82 is made from a single-crystal silicon wafer, which is oriented in the 100 crystal plane (in accordance with common practice in semiconductor device fabrication). An edge-emitting laser diode 84 is mounted parallel to this plane. A MPD 94 may be placed adjacent to the rear reflector of the laser diode in order to measure the laser output power.

A mirror 86 is cleaved in the 111 crystal plane, which is naturally oriented at an angle $\alpha=54.7°$ relative to the 100 plane. This sort of mirror implementation is advantageous in avoiding the need to etch the mirror at an angle, but it means that the mirror reflects the beam from laser diode 84 diagonally, rather than perpendicularly upward as in FIG. 3. To alleviate this problem, the light from laser diode 84 is collected by an eccentric lens 88, as shown in FIG. 4.

In this embodiment, IPM 80 comprises only a single patterned element 90. As noted earlier, this element may be a MLA, or it may be a dual-DOE, with patterns on both the inner and outer surfaces. A cover 92 may be placed over the IPM to protect the outer DOE surface.

As a further alternative (not shown in the figures), the optical bench of the IPM may be flat, without etching or cleaving of a diagonal surface as in FIGS. 3 and 4. In this case, the diagonal mirror surface (at 45° or any other desired angle) may be produced by gluing or otherwise attaching a suitable prism with a reflective coating onto the bench in front of the laser diode.

Figure 8:
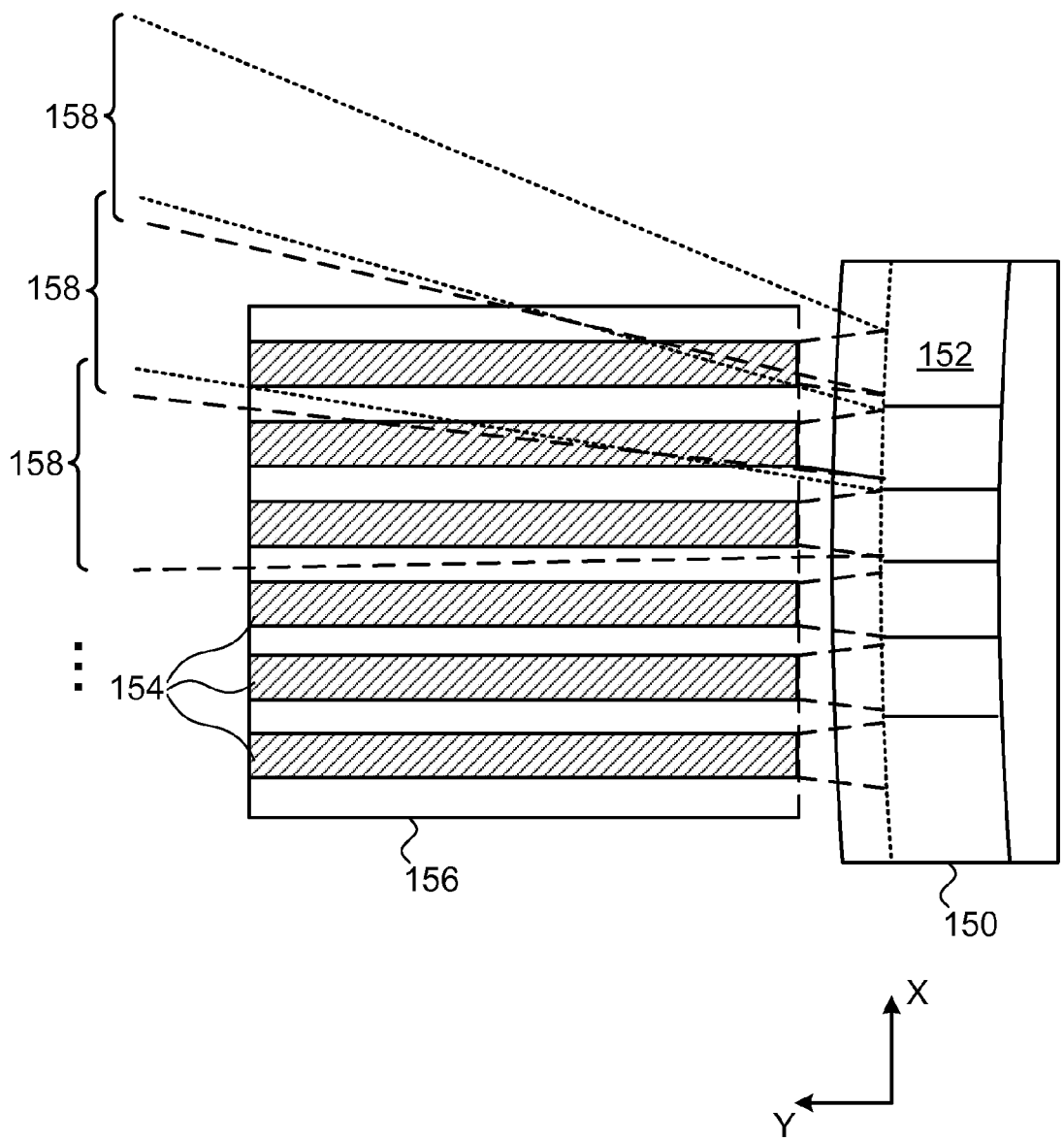
FIG. 8 is a schematic top view of an optoelectronic submodule used in an IPM, in accordance with an embodiment of the present invention.
Figure 9:
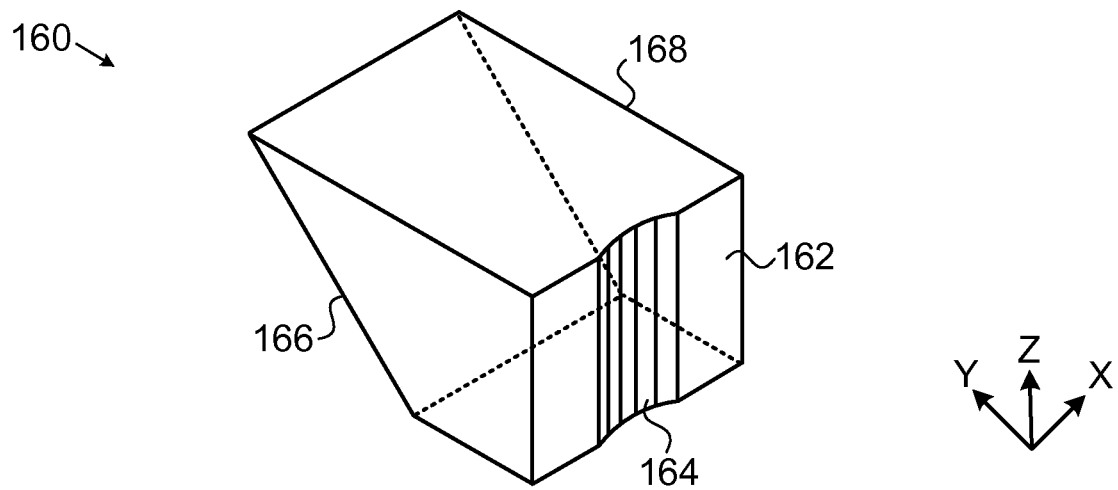
FIGS. 9 and 10 are schematic pictorial views of reflectors for use in an IPM, in accordance with embodiments of the present invention.
Figure 10:
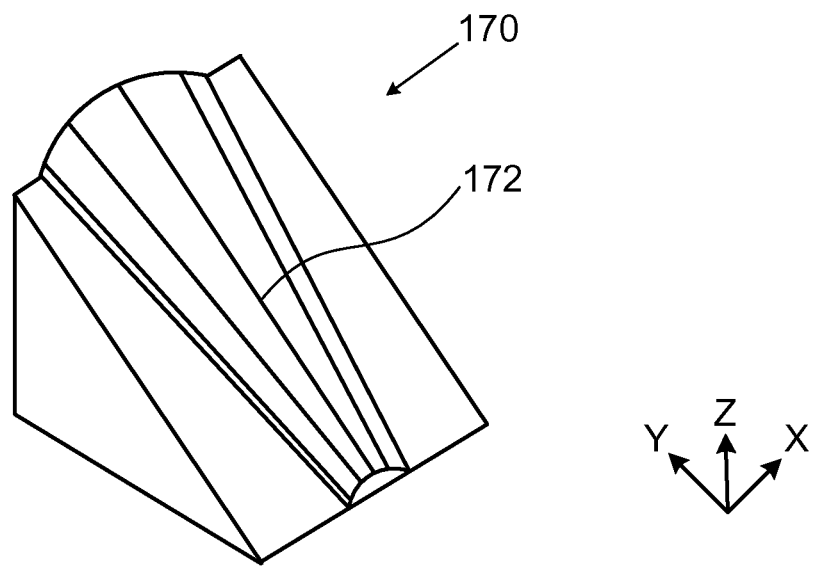

Further alternatively or additionally, the reflector that reflects the laser output may comprise an optical surface that is not flat, but rather has a profile selected to impart a desired convergence or divergence to the radiation. For example, the reflector may be curved in order to correct the astigmatism or otherwise shape the beam of the laser or lasers that are used. Curved mirror and prism configurations of this sort are shown in FIGS. 8, 9 and 10. With appropriate curvature of an optical surface of the mirror or prism, it may be possible in some applications to alleviate the need for a refractive element (such as lens 66 or 88) to collect and direct light from the laser diode through the patterned optical element.

Figure 11:
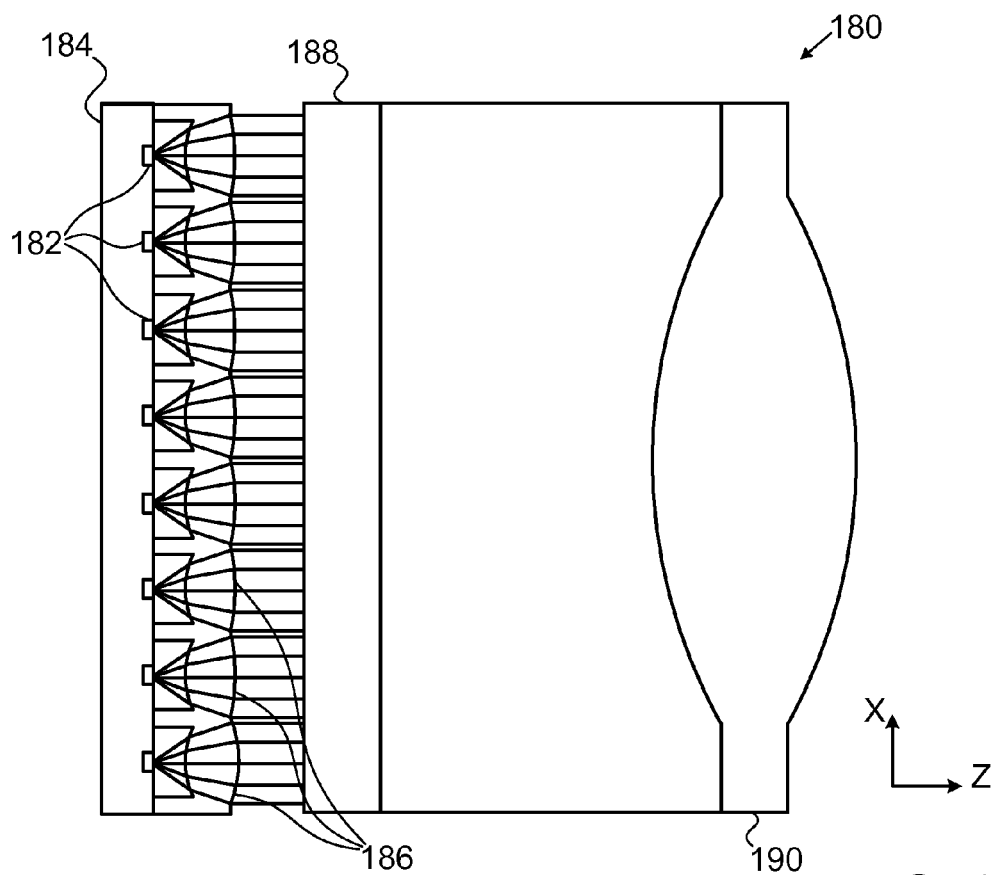
FIG. 11 is a schematic side view of an IPM, in accordance with another embodiment of the present invention.

The IPM configurations shown in the figures above are illustrated and described here only by way of example, and other configurations are possible. For example, the beam characteristics of the laser diodes in these figures are characteristic of single-mode lasers. In an alternative embodiment, a multi-mode laser may be used, possibly with the addition of a suitable refractive element to correct the astigmatism of the multi-mode laser beam. As yet another alternative, the IPM may comprise one or more surface-emitting devices, such as a light-emitting diode (LED) or vertical-cavity surface-emitting laser (VCSEL) diodes, which emit radiation directly into the Z-direction, so that a turning mirror is not required. (An embodiment based on a VCSEL array is shown in FIG. 11.)

Fabrication Processes

Figure 5:
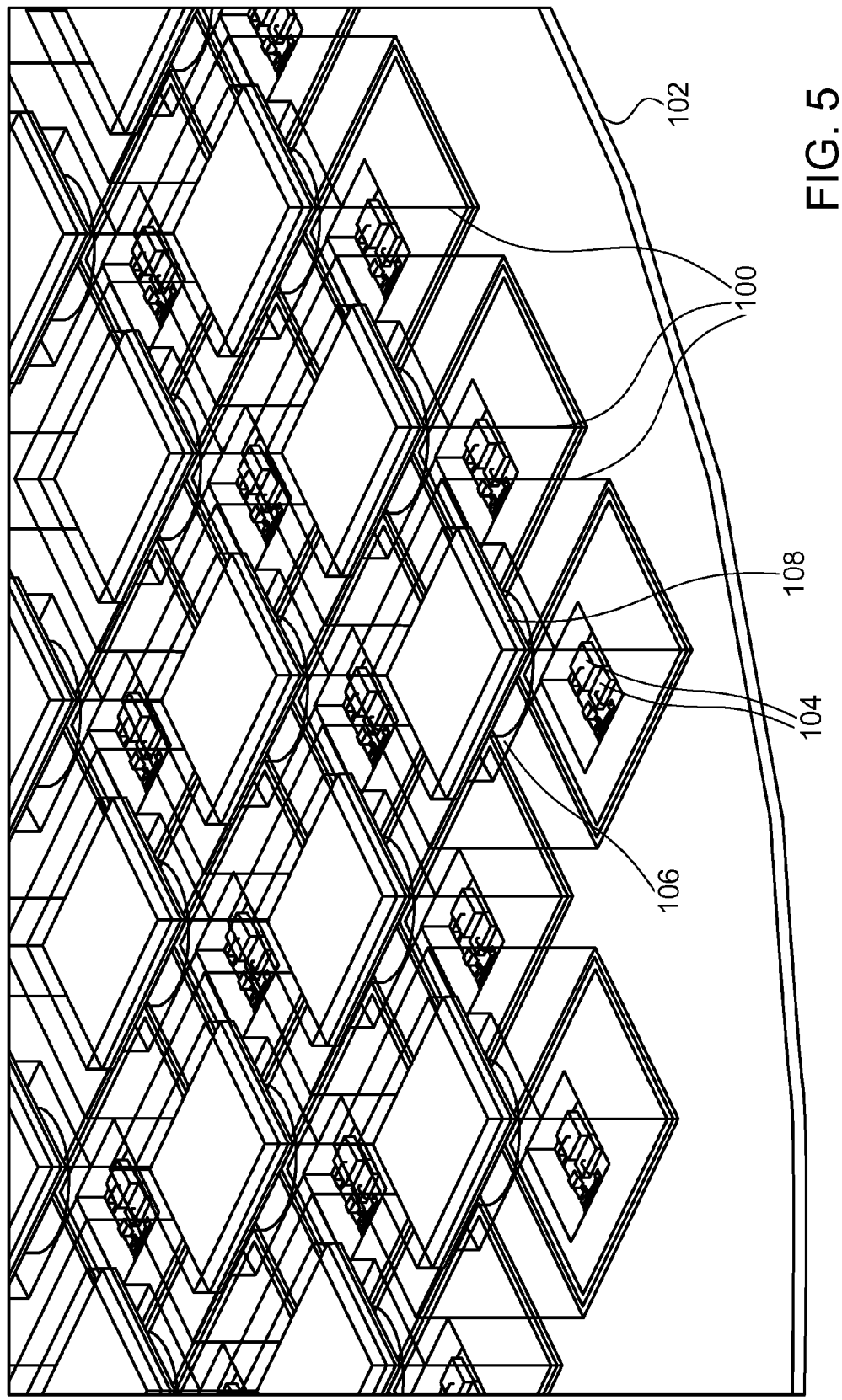
FIG. 5 is a schematic pictorial illustration showing multiple IPMs on a silicon wafer, in accordance with an embodiment of the present invention.

FIG. 5 is a schematic pictorial illustration showing multiple IPMs 100 on a silicon wafer 102, in accordance with an embodiment of the present invention. Wafer-scale manufacturing makes it possible to produce large numbers of IPMs together at low cost. In this figure, IPMs 100 are shown on the wafer as separate cubes. Each IPM contains optoelectronic components 104 (such as the laser diode and MPD) on an indented silicon optical bench. A lens 106 and a patterned optical element 108 are assembled and aligned on each IPM individually.

Alternatively, the IPMs may be produced by overlaying and bonding to the wafer complete, wafer-size layers of refractive and patterned elements (made from glass or plastic, for example), in alignment with the silicon optical benches holding the optoelectronic components. After the layers have been bonded together, they are diced to produce the individual IPMs.

Figure 6:
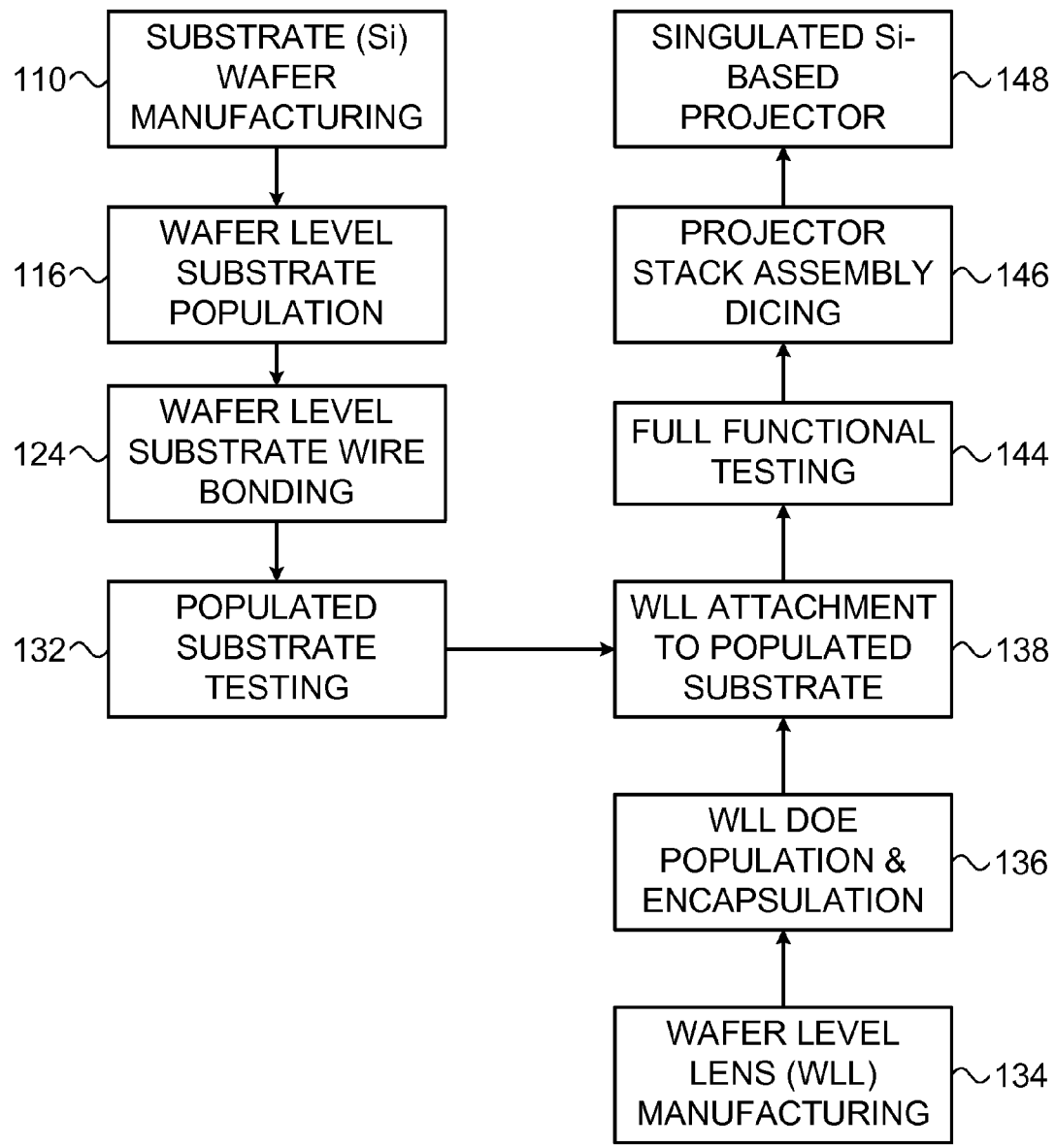
FIG. 6 is a flow chart that schematically illustrates a method for production of IPMs, in accordance with an embodiment of the present invention.
Figure 7A:
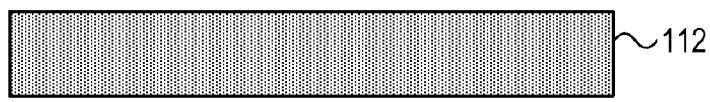
FIGS. 7A-7G are a sequence of schematic sectional views showing stages in the production of an IPM, in accordance with an embodiment of the present invention.
Figure 7B:
Figure 7C:
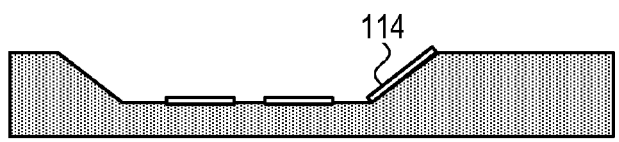
Figure 7D:
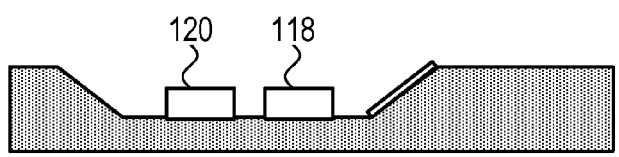
Figure 7E:
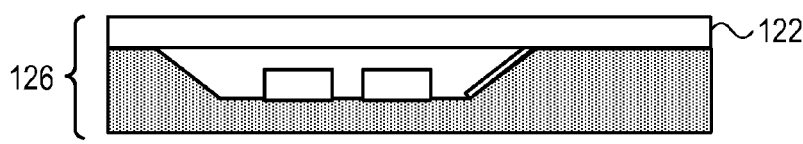
Figure 7F:
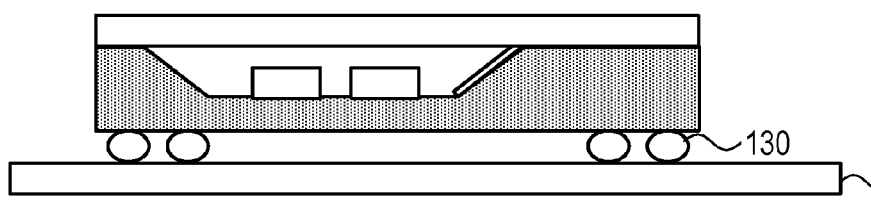
Figure 7G:
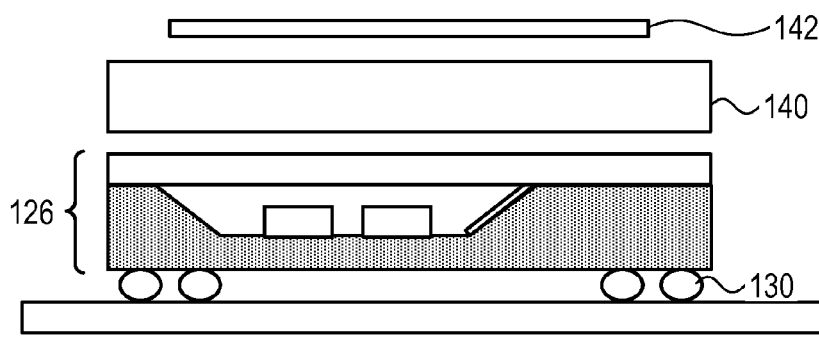

Reference is now made to FIGS. 6 and 7A-G, which schematically illustrate a method for production of IPMs, in accordance with an embodiment of the present invention. FIG. 6 is a flow chart, while FIGS. 7A-G are a sequence of sectional views showing stages in the production of an IPM.

According to this method, a silicon substrate 112 of the silicon optical benches is prepared, at a wafer manufacturing step 110. In this step, substrate 112 is etched or cleaved to create a suitable recess 113 and thus provide the diagonal surface for the mirror (unless a separate prism is used, as mentioned above). Metal layers are then added, with pads (not shown) for attachment of the optoelectronic components (laser diode and MPD) and conductors for the necessary electrical connections. A mirror surface 114 may also be coated with metal at this stage.

Optoelectronic components 118, 120 are then bonded, mechanically and electrically, to the pads on the silicon optical bench, at a substrate population step 116. Electrical connections may be made by wire bonding, for example, or by any other suitable technique, at a bonding step 124. High accuracy is desirable in steps 116 and 124, with placement error typically no greater than ±1 µm, and rotation error no more than 0.5°. This sort of micro-assembly, with accurate alignment of components, can be carried out by various service providers, such as Luxtera (Carlsbad, Calif.), Avago Technologies (San Jose, Calif.), and EZconn Czech a.s. (Trutnov, Czech Republic). After micro-assembly, the optoelectronics may optionally be covered by a transparent lid 122, creating an optoelectronic sub-module 126. This sub-module may itself be used as an accurate, low-cost laser source even without the refractive and patterned optical elements that are described herein.

The optoelectronic components on each of sub-modules 126 are tested, at a populated substrate testing step 132, in order to identify and reject components that are non-functional or otherwise faulty. The individual sub-modules 126 are then diced apart, and the rejected units are discarded. This step enhances the ultimate production yield of IPMs.

The acceptable sub-modules 126 are bonded mechanically to an underlying wafer substrate 128. A large number of individual IPMs may be assembled in this manner on a single wafer (typically 500-1000 units per 8" wafer). At this stage, the entire optoelectronic sub-module of each IPM is aligned as a unit relative to the wafer substrate. The optoelectronic sub-module may, for example, be attached to the wafer substrate by a malleable glue, which is then cured after the package has been adjusted to the proper alignment. This alignment may be active—based on energizing the laser diodes and then adjusting the beam direction, or passive—based on geometrical considerations without energizing the laser diodes.

Alternatively, wafer substrate 128 may itself serve as the optical bench, with sub-modules 126 formed directly on this substrate. In this case, the IPMs may be individually aligned after substrate population, if necessary, by adjustment of the refractive and/or patterned optical elements in each IPM.

In addition to mechanical bonding of each sub-module 126 to the underlying wafer substrate 128, the electrical conductors on the silicon optical bench are coupled to corresponding conductors (not shown) on substrate 128. This step may be carried out by conventional methods, such as wire bonding. Alternatively, the silicon optical bench may contain conductive vias (not shown), which serve as electrical feed-throughs to make contact between the components on the upper side of the bench and conducting pads on wafer substrate 128. For example, the vias may connect to terminals 130 of a ball-grid array (BGA) or any other suitable type of interconnect that is known in the art. Once the mechanical and electrical bonding steps have been completed, the optoelectronic packages on the wafer substrate may be tested.

In parallel with the above electrical manufacturing steps, a wafer-size array of lenses 140 is produced, at a wafer-level lens (WLL) manufacturing step 134. This lens array is overlaid with one or more wafer-size arrays of patterned optical elements 142, such as DOEs, at a WLL overlay step 136. The optical layers of lenses and patterned elements may be produced, for example, by molding suitable glass or plastic wafers. The wafer-size optical array is precisely manufactured and has fiducial marks to enable exact alignment with the beams emitted by the optoelectronic components on the wafer substrate 128 (typically to an accuracy of ±5 µm).

The optical array is then overlaid on and aligned with the array of optoelectronic packages, in a WLL attachment step 138. Appropriate spacers may be included between lenses 140, patterned elements 142, and optoelectronic sub-modules 126, as shown in FIGS. 3 and 4, for example. Thus, the optical emitter in each sub-module 126 is precisely aligned with corresponding refractive and patterned optical elements 140 and 142, all of which are mounted on substrate 128.

The complete wafer-size assembly may be tested at this stage, at a functional testing step 144. The individual IPMs are then separated by dicing substrate 128 and the overlying optical layers, at a dicing step 146. The IPMs are packaged to form the type of projection sub-assemblies 32 that is shown in FIG. 2, at a projector packaging step 148.

Multi-Emitter Modules and Curved Reflectors

FIG. 8 is a schematic top view of an optoelectronic sub-module used in an IPM, in accordance with an embodiment of the present invention. This sort of sub-module may be used, for example, in IPMs of the general design shown in FIG. 3 or FIG. 4. In the embodiment of FIG. 8, however, instead of a single light source, the pictured sub-module comprises a row of edge-emitting optoelectronic elements 154, such as laser diodes, which are formed on a substrate 156, such as a silicon wafer. Elements 154 emit radiation in a direction parallel to the substrate.

A reflector 150 on the substrate turns the radiation emitted by elements 154 away from the substrate, which is oriented in the X-Y plane, toward the Z-axis. The reflector may be integrally formed in substrate 156, as shown in FIG. 3, or it may alternatively comprise a separate element, which is positioned on the substrate and aligned with optoelectronic elements 154. Although reflector 150 could simply comprise a flat reflecting surface, in the pictured embodiment the reflector comprises a convex reflective surface 152, made up of one or more curved surfaces or multiple flat surfaces which spread the radiation beams emitted by elements 154. In an alternative embodiment (not shown in the figures), reflective surface 152 may be configured to concentrate the beams from elements 154 into a narrower output beam. Generally speaking, the reflector may comprise a surface that is non-flat with any suitable profile to impart a desired convergence or divergence to the beam or beams.

Each of optoelectronic elements 154 emits radiation that forms a respective stripe 158. (Although FIG. 8 shows six such elements and respective stripes, a larger or smaller number of elements and stripes may be used, depending on application requirements.) Convex surface 152 of reflector 150 causes stripes 158 to spread over a relatively wide area and overlap the adjacent stripes at their edges. Controller 31 (FIG. 1) may activates elements 154 to emit radiation sequentially, in synchronization with a rolling shutter of image sensor 38 during each image frame captured by imaging assembly 28, as described in the above-mentioned U.S. patent application Ser. No. 12/762,373. Alternatively, elements 154 may be activated concurrently, in either pulsed or continuous-wave (CW) mode.

In embodiments in which the patterned element (or elements) in the IPM comprises a MLA or other transparency, each stripe 158 passes through a different, respective region of the transparency, and thus creates a respective part of the overall illumination pattern corresponding to the pattern embedded in the transparency. Projection optics 34 project this pattern onto the object.

On the other hand, in embodiments in which the patterned element comprises a DOE, either the collecting lens in the IPM or one of the patterned elements (or the geometry of optoelectronic elements 154 themselves) is typically configured to create an appropriate "carrier" angle for the beam emitted by each of the optoelectronic elements. In such embodiments, the beams emitted by the different optoelectronic elements use different parts of the collecting lens, which may therefore be designed so that the collimated beams created by the lens exit at respective angles corresponding to the desired fan-out of stripes 158. Alternatively, reflector 150 may comprise some other type of optics, such as a blazed grating with as many different zones as there are optoelectronic elements.

FIG. 9 is a schematic pictorial view of a reflector 160 for use in an IPM, in accordance with an alternative embodiment of the present invention. This prism-shaped reflector may be used in the optoelectronic sub-module of FIG. 8 in place of reflector 150. In this case, radiation emitted by elements 154 is reflected internally from a diagonal interior surface 166 (typically with a suitable reflective coating) of reflector 160. The radiation from elements 154 enters reflector 160 via a curved entry surface 164 of a front face 162 of the prism and exits via a flat exit surface 168. (Alternatively, the exit surface may be curved, in addition to or instead of the entry surface.) As a result, the respective beams generated by elements 154 spread apart and overlap partially with the adjacent beams.

FIG. 10 is a schematic pictorial view of a reflector 170 for use in an IPM, in accordance with yet another embodiment of the present invention. Reflector 170 has a curved reflective surface 172 and may be used in an IPM in place of reflector 150 or reflector 160. Alternatively, reflector 170 (as well as reflectors 150 and 160) may be used to shape the beam of a single laser diode or other optoelectronic element, as in the embodiments of FIGS. 3 and 4. Curved surface 172 may be shaped, for example, to widen the slow axis (i.e., the narrower beam dimension in a non-symmetrical laser output) of the laser output in order to illuminate a wider area of the patterned element in the IPM. Alternatively or additionally, the curved surface may be configured to shape the Gaussian distribution that is typical of the laser fast axis into a flat-topped beam profile in order to illuminate the patterned element more uniformly.

The design of surface 172 that is illustrated in FIG. 10 is useful particularly in widening the slow axis of the beam. Surface 172 is shaped as a part of a cone, tilted at 45°. In principle, if the reflecting surface were not tilted, a cylindrical mirror would be sufficient to widen the slow axis. Since reflector 170 is used to divert the laser beam by 90°, however, surface 172 has a different distance from the laser aperture for each section along the fast axis of the laser, and therefore requires a varying radius of curvature to widen the slow axis uniformly. Thus, as shown in FIG. 10, the radius of curvature of surface 172 grows with distance from the laser aperture. A good approximation to the required shape is a cone. The mirror shape can be further optimized to improve the uniformity of illumination of the patterned element.

FIG. 11 is a schematic side view of an IPM 180, in accordance with another embodiment of the present invention. IPM 180 may be used in system 20 in place of illumination assembly 22, for example. IPM 180 comprises radiation sources in the form of a two-dimensional matrix of optoelectronic elements 182, which are arranged on a substrate 184 and emit radiation in a direction perpendicular to the substrate. Although FIG. 11 shows only a single row of elements 182 arrayed along the X-axis, IPM 180 typically comprises multiple, parallel rows of this sort, forming a grid in the X-Y plane. FIG. 11 illustrates a grid with eight columns of elements 182, but larger or smaller matrices, not necessarily square or rectilinear, may alternatively be used.

In contrast to the preceding embodiments, elements 182 comprise surface-emitting devices, such as light-emitting diodes (LEDs) or vertical-cavity surface-emitting laser (VCSEL) diodes, which emit radiation directly into the Z-direction. An array of microlenses 186 (or other suitable microoptics, such as total internal reflection-based microstructures) is aligned with elements 182, so that a respective microlens collects the radiation from each element and directs it into an optical module. The optical module comprises, inter alia, a suitable patterned element 188, as described above, and a projection lens 190, which projects the resulting pattern onto the scene.

IPM With Scanning Mirror

Figure 12:
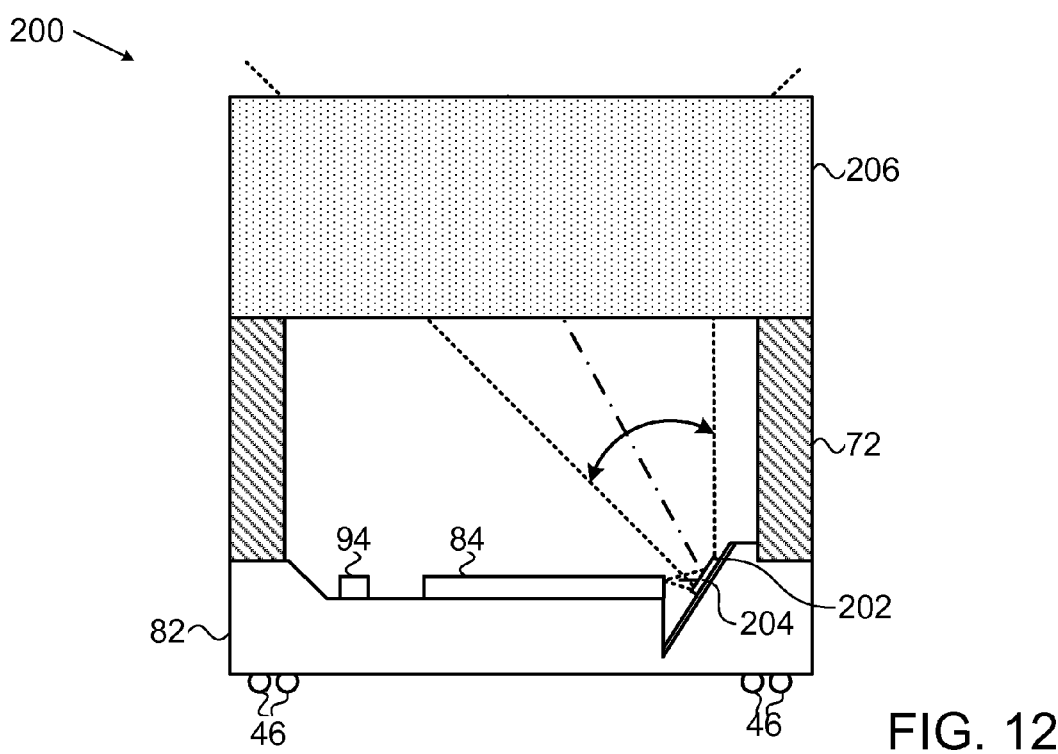
FIG. 12 is a schematic sectional view of an IPM, in accordance with yet another embodiment of the present invention.

FIG. 12 is a schematic sectional view of an IPM 200, in accordance with yet another embodiment of the present invention. Some elements of this embodiment are similar to those of IPM 80 (shown in FIG. 4) and are therefore marked with the same numbers. In IPM 200, however, the stationary mirror of the preceding embodiments is replaced by a scanning mirror 202. This mirror is mounted on a suitable driver, such as on a micro-electrical mechanical system (MEMS) driver chip 204, which typically provides an angular scan range on the order of ±5° in one or two scan dimensions (X and Y). Chip 204 is fixed to a diagonal surface of silicon optical bench 82. This diagonal surface may be produced by cleaving a single-crystal silicon wafer in the 111 crystal plane, as described above in reference to IPM 80. In the pictured embodiment, mirror 202 may receive and scan the beam from laser diode 84 directly, without intervening optics (for collimation, for example), thus reducing the width of IPM 200 and simplifying the alignment of optical bench 82. Laser diode 84 and mirror 202 themselves can be placed in alignment on bench 82 with high accuracy, typically to within a few microns.

IPM 200 comprises an optical stack 206, comprising one or more optical elements that typically collimate the scanned beam reflected by mirror 202 and may also adjust the beam angles. Optical stack 206 may comprise a refractive and/or diffractive optical element, which enlarges the angular range of the output beam from IPM 200. A larger range of this sort is desirable in applications, such as system 20, in which the field of view is larger than the limited scan range of mirror 202. Additionally or alternatively, the optical stack may comprise an eccentric lens, of the type shown in FIG. 4.

Further additionally or alternatively, IPM 200 may comprise additional components (as part of optical stack 206 or as separate components, not shown in the figure) for controlling and monitoring the scanned beam, as described, for example, in U.S. Provisional Patent Application 61/425,788, filed Dec. 22, 2010, which is incorporated herein by reference. In one embodiment, optical stack 206 may comprise a patterned element, such as a diffractive optical element (DOE), and driver chip 204 may direct the beam from laser 84 through the DOE at different angles in order to tile the field of view of IPM 200 with multiple instance of the pattern, as described in this provisional patent application.

The sort of scanning arrangement that is implemented in IPM 200 can be used for various purposes. For example, the scan may be synchronized with the rolling shutter of image sensor 38, as is described generally in the above-mentioned U.S. patent application Ser. No. 12/762,373. Alternatively or additionally, IPM 200 can be used to create patterned illumination without the use of a patterned element (which may thus be eliminated from the IPM) by pulsing laser diode 84 on and off in synchronization with the scan of mirror 202. This sort of patterned illumination can be used in pattern-based depth mapping schemes, such as those described above, including schemes based on time-coded illumination, such as those described in U.S. Provisional Patent Application 61/415,352, filed Nov. 19, 2010, which is incorporated herein by reference. Alternatively, modules based on the principles of IPM 200 may be used in a variety of other scanned-beam applications that can benefit for a very small, low-cost scanner.

Thus, although the embodiments described above relate mainly to depth mapping, the principles of the IPMs in these embodiments may likewise be used in other applications that involve projection of a patterned beam. It will therefore be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
a semiconductor substrate;
a plurality of edge-emitting radiation sources which are mounted together on a surface of the substrate so as to emit respective beams of optical radiation along respective axes that are parallel to the surface;
a reflector, which is fixed to the substrate in a location on the axes and which comprises multiple adjacent flat surfaces, wherein each flat surface extends from the substrate to the top of the reflector and is configured to reflect the optical radiation emitted by a respective radiation source among the plurality of the radiation sources at a different, respective angle so that all of the beams are deflected in a direction that is angled away from the surface while imparting a desired convergence or divergence to the optical radiation;
and one or more optical elements, which are mounted on the substrate so as to receive and transmit the optical radiation reflected by the reflector.

2. The apparatus according to claim 1, wherein the radiation sources comprise laser diodes.

3. The apparatus according to claim 1, wherein the adjacent flat surfaces define a convex reflective structure, which is configured to spread the beams of the optical radiation.

4. The apparatus according to claim 3, wherein each of the radiation sources is configured to emit radiation that forms a respective stripe, and wherein the convex reflective structure causes the stripes to spread over an area.

5. The apparatus according to claim 4, wherein the convex reflective structure causes the stripes to overlap at respective edges of the stripes.

6. The apparatus according to claim 1, wherein the adjacent flat surfaces are configured to concentrate the beams from the plurality of the radiation sources into a narrower output beam.

7. The apparatus according to claim 1, wherein the adjacent flat surfaces define a reflective structure having a conical shape.

8. The apparatus according to claim 1, and comprising a controller, which is configured to activate the radiation sources to emit the respective beams sequentially.

9. The apparatus according to claim 1, and comprising a controller, which is configured to activate the radiation sources to emit the respective beams concurrently.

10. The apparatus according to claim 1, wherein the one or more optical elements comprise a patterned element.

11. An imaging system, comprising:
an illumination assembly, which is configured to project a pattern of optical radiation onto an object, and which comprises:
a semiconductor substrate;
a plurality of edge-emitting radiation sources which are mounted together on a surface of the substrate so as to emit respective beams of optical radiation along respective axes that are parallel to the surface;
a reflector, which is fixed to the substrate in a location on the axes and which comprises multiple adjacent flat surfaces, wherein each flat surface extends from the substrate to the to of the reflector and is configured to reflect the optical radiation emitted by a respective radiation source among the plurality of the radiation sources at a different, respective angle so that all of the beams are deflected in a direction that is angled away from the surface while imparting a desired convergence or divergence to the optical radiation;

and one or more optical elements, which are mounted on the substrate so as to receive and transmit the optical radiation reflected by the reflector toward the object;

an imaging assembly, which is configured to capture an image of the pattern on the object;

and a processor, which is configured to process the image so as to generate a depth map of the object.

12. A method for producing a photonics module, comprising:

mounting a plurality of edge-emitting radiation together on a surface of a semiconductor substrate so that the source emits optical radiation along respective axes that are parallel to the surface;

fixing a reflector to the substrate in a location on the axes, the reflector comprising multiple adjacent flat surfaces, wherein each flat surface extends from the substrate to the top of the reflector and is configured to reflect the optical radiation emitted by a respective radiation source among the plurality of the radiation sources at a different, respective angle so that all of the beams are deflected in a direction that is angled away from the surface while imparting a desired convergence or divergence to the optical radiation;

and mounting one or more optical elements on the substrate so as to receive and transmit the optical radiation reflected by the reflector.

13. The method according to claim 12, wherein each of the radiation sources is configured to emit radiation that forms a respective stripe, and wherein the reflector causes the stripes to spread over an area.

14. The method according to claim 12, wherein the reflector is configured to concentrate the beams from the plurality of the radiation sources into a narrower output beam.

15. The method according to claim 12, and comprising activating the radiation sources to emit the respective beams sequentially.

16. The method according to claim 12, and comprising activating the radiation sources to emit the respective beams concurrently.

* * * * *